US012361938B2

(12) United States Patent
Klem et al.

(10) Patent No.: US 12,361,938 B2
(45) Date of Patent: Jul. 15, 2025

(54) BUILDING AUTOMATION SYSTEM FOR CONTROLLING CONDITIONS OF A ROOM

(71) Applicant: Siemens Industry, Inc., Alpharetta, GA (US)

(72) Inventors: Heather Klem, Arlington Heights, IL (US); Udo Koch, Mount Prospect, IL (US); Nellie Martin, Libertyville, IL (US); Mark McNally, Palatine, IL (US); Christine Moran, Elk Grove, IL (US); Kristine C. Rodell, Island Lake, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 409 days.

(21) Appl. No.: 17/628,395

(22) PCT Filed: Jul. 29, 2019

(86) PCT No.: PCT/US2019/043834
§ 371 (c)(1),
(2) Date: Jan. 19, 2022

(87) PCT Pub. No.: WO2021/021096
PCT Pub. Date: Feb. 4, 2021

(65) Prior Publication Data
US 2022/0284895 A1    Sep. 8, 2022

(51) Int. Cl.
H04L 12/28 (2006.01)
G10L 15/22 (2006.01)
G10L 15/30 (2013.01)

(52) U.S. Cl.
CPC .............. G10L 15/22 (2013.01); G10L 15/30 (2013.01); H04L 12/282 (2013.01);
(Continued)

(58) Field of Classification Search
CPC .. G05B 2219/23386; G05B 2219/2614; H04L 12/282
See application file for complete search history.

(56) References Cited

U.S. PATENT DOCUMENTS 9,137,281 B2    9/2015  Warrick et al.
10,733,222 B1*  8/2020  Miller ................... G06F 16/335
(Continued)

FOREIGN PATENT DOCUMENTS

CN    103843306 A    6/2014
CN    105308679 A    2/2016
(Continued)

OTHER PUBLICATIONS

Guo Lili et al:"Use of voice recognition technology in building automatic control system", science and technology field, No. 01, p. 150-153, 1671-4792-(2010)1-0150-04, Jan. 30, 2010.
(Continued)

Primary Examiner — Michael W Choi

(57) ABSTRACT

There is described a building automation system for controlling conditions of a room. The building automation system comprises a room device, a first interface, a second interface, and a managing device. The first interface receives a voice command based on a voice utterance detected in the room by the voice enabled system. The second interface receives a hospitality user profile from a hospitality information system. The hospitality user profile identifies one or more user parameters associated with the room. The managing device of the building automation system includes a guest room profile that identifies one or more room parameters associated with the room. The managing device controls the room device based on the voice command, the hospitality user profile, and the guest room profile.

20 Claims, 10 Drawing Sheets

(52) U.S. Cl.
CPC .............. *G05B 2219/23386* (2013.01); *G05B 2219/2614* (2013.01); *G10L 2015/223* (2013.01)

(56) References Cited

U.S. PATENT DOCUMENTS

| | | | |
|---|---|---|---|
| 2007/0250191 A1* | 10/2007 | Rourke | G05B 15/02 |
| | | | 340/3.1 |
| 2018/0167516 A1* | 6/2018 | Warrick | G05B 19/042 |
| 2018/0211666 A1 | 7/2018 | Kolavennu et al. | |
| 2019/0155468 A1 | 5/2019 | Huang et al. | |
| 2019/0190992 A1 | 6/2019 | Warrick | |

FOREIGN PATENT DOCUMENTS

| | | |
|---|---|---|
| CN | 107615377 A | 1/2018 |
| CN | 109375660 A | 2/2019 |
| WO | 2017147081 | 8/2017 |

OTHER PUBLICATIONS

PCT Search Report dated Oct. 4, 2019, for PCT Application No. PCT/US2019/043834, 14 pages.

* cited by examiner

BUILDING AUTOMATION SYSTEM FOR CONTROLLING CONDITIONS OF A ROOM

FIELD OF THE INVENTION

This application relates to the field of building automation systems and, more particularly, to a building automation system for controlling conditions of a room for a facility managed by the system.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

The elements of a building automation system may be widely dispersed throughout a large environment, such as a commercial building or campus. For example, an HVAC system includes temperature sensors and ventilation damper controls as well as other elements that are located in virtually every area of a facility or campus. The different areas of a building automation system may have different environmental settings based on the use and personal likes and care needs of people in those areas, such as offices, conference rooms, hotel rooms, and hospital patient rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational information between operating elements, such as environmental devices located in rooms and the centralized control station. A centralized control station of the building automation system may include user profiles to control these environmental devices.

For smaller environments, such as a home or small office, an intelligence voice enabled device may be used to control certain aspects of room environments, such as turning on-and-off a light. Voice enabled devices (such as an Alexa® device or Echo® device commercially available from Amazon.com of Seattle, WA, U.S.A.) commonly receive voice requests from a user in proximity of the device and cause a room device such as a light switch to operate based on a profile for the device as well as the voice request as registered with the voice enabled device provider. Voice enabled devices are generally individual devices operating in a single open area, such as a room, and may communicate with a remote web server for assistance with voice recognition, voice analysis, and language processing.

SUMMARY

In accordance with embodiments of the disclosure, there is provided a building automation system that utilizes information collected or stored by other systems to enhance control of room devices, such as environmental devices, in rooms of a managed facility, such as a hospital or a hotel. In particular, the building automation system may combine voice control with building automation and user preferences. An administrator of the facility may associate preferences of a user with the voice control.

A general system may include the building automation system as well as these other systems. By utilizing information collected or stored by these various systems, the general system may maximize efficiency, speed, customer satisfaction, and accuracy of itself as well as one or more of its individual systems. Coordination among the various systems is automated, thus minimizing the need for manual coordination. The system may improve efficiency and speed by automatic processing of work orders and adjustments when one or more occupants of the room are changed, thus avoiding the need to create them and wait for personnel to become available. Occupant satisfaction may improve since changes occur automatically and some occupant needs may be generated at check-in. Accuracy may improve by automating and mapping occupant needs with the profiles, thus doing away with manual entries by technicians. These advancements are particularly advantageous for rooms at locations subject to frequent changes such as hospital and hotel facilities.

One aspect is a building automation system for controlling conditions of a room. The building automation system comprises a room device, a first interface, a second interface, and a managing device. The room device is associated with the room. The first interface is operatively coupled to a voice enabled system associated with the room, and the first interface is configured to receive a voice command based on a voice utterance detected in the room by the voice enabled system. The second interface is operatively coupled to a hospitality information system associated with the room. The second interface is configured to receive a hospitality user profile from the hospitality information system. The hospitality user profile identifies one or more user parameters associated with the room. The managing device is operatively coupled to the room device associated with the room. The managing device includes a guest room profile that identifies one or more room parameters associated with the room. The managing device is configured to control the room device based on the voice command, the hospitality user profile, and the guest room profile.

Another aspect is a method of a building automation system for managing a room device of a room. A voice command based on a voice utterance detected in the room by the voice enabled system and a hospitality user profile from a hospitality information system are received. The hospitality user profile identifies one or more user parameters associated with the room. A guest room profile of the building automation system is accessed, and the guest room profile identifies one or more room parameters associated with the room. The room device of the room is controlled based on the voice command, the hospitality profile, and the guest room profile.

Yet another aspect is a system for controlling conditions of a room comprising a voice enabled system, a hospitality information system, and a building automation system. The voice enabled system is associated with the room, and the voice enable system is configured to receive a voice command based on a voice utterance detected in the room by the voice enabled system. The hospitality information system is associated with the room, and the hospitality information system includes a hospitality user profile that identifies one or more user parameters associated with the room. The building automation system is operatively coupled to the voice enabled system and the hospitality information system. The building automation system includes a room device associated with the room and a managing device operatively coupled to the room device. The managing device includes a guest room profile that identifies one or more room parameters associated with the room. The managing device is configured to control the room device based on the voice command, the hospitality user profile, and the guest room profile.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
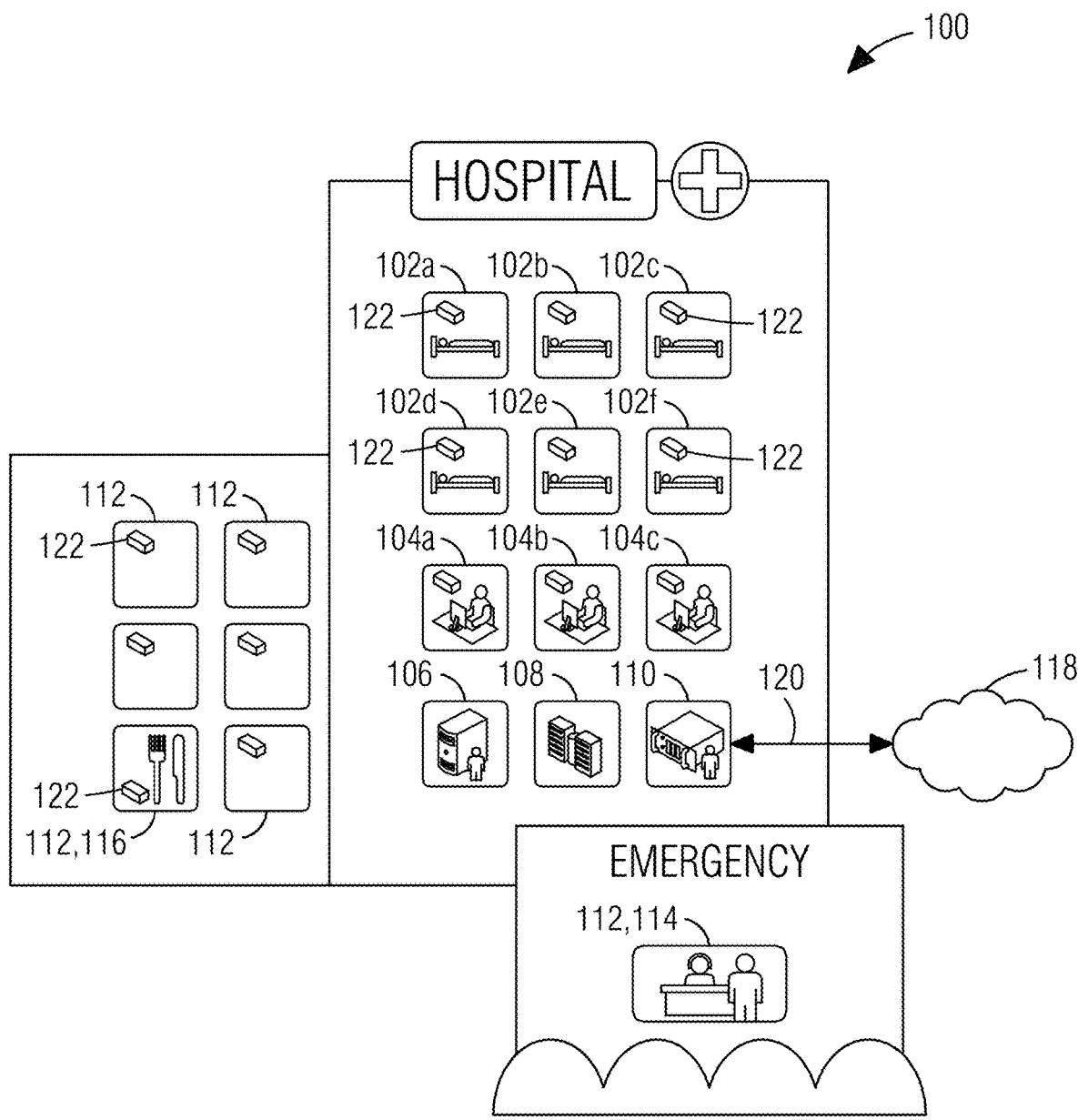
FIG. 1 is a diagram representing an example facility for implementing a system that utilizes a building automation system, a voice enabled system, a hospitality information system, and the techniques described herein.

Various technologies that pertain to systems and methods that facilitate coordination of a building automation system with other systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system correlates a guest room profile for a building automation system and a hospitality user profile for a hospitality information system. The system may also correlate a voice profile for a voice enabled system with the guest room profile and the hospitality user profile. For some embodiments, a building automation system may manage a guest room using correlated profiles based on room condition preferences of a user (e.g., hospital patient or hotel guest) or administrator of the room without the need for knowing the identity of the user, thus maximizing security and data privacy for the user. For some other embodiments, two or more profiles, or portions thereof, may be integrated into a unified profile and provided to a processing component of the building automation system. In the alternative, the profiles, or portions thereof, may feed separately to the processing component. Partial integration is particularly useful where the building automation system does not need to know the identity of particular users (e.g., hospital patients or hotel guest) or their preferences for threshold conditions. Examples of threshold conditions include, but are not limited to, restricted control of blinds or shades due to a guest's sensitivity to skin or eye conditions to certain light or restricted control of room temperature or a room temperature threshold for intensive care, pre-natal care, or other guest care). The system correlates profiles to facilitate management of the building automation system and its associated room devices, such as environmental devices, which are associated with respective rooms in a facility. Utilizing these profiles, the system may control the features of the room with voice control, which may be associated with a voice profile of a voice enabled system, as associated with a respective user profile(s).

Examples of a hospitality information systems include, but are not limited to, health information systems that utilize Health Level Seven International (HL7) and hotel information systems for tracking hospitality reservations and membership information. HL7, in particular, is a set of standards, formats, and definitions for exchanging (i.e., interoperability) and managing electronic health records. For example, the hospitality information system may manage common health data associated with clinical documents, electronic health records, personal health records, prescription medical information, financial records, and reporting. Likewise, the hospitality information may manage common lodging information associated with reservations, scheduling, events, membership, financial records, and reporting.

Referring to FIG. 1, there is shown a facility 100 for implementing a system that utilizes a building automation system, a voice enabled system, a hospitality information system, and the techniques described herein. The facility 100 represents any type of structure having multiple, partitioned areas for accommodating occupants, business operations, and information technology. Examples of a facility include medical facilities such as hospitals, clinical centers, medical offices, treatment centers, residence homes, hospices, and rehabilitation centers as well as lodging facilities such as hotels, motels, suites, resorts, timeshares, institutional housing, cooperative housing, and condominiums.

As shown in FIG. 1, the facility 100 may include guest rooms 102 (102a, 102b, . . . 102n), administrative rooms 104 (104a, 104b, . . . 104n), hospitality information system rooms 106, building automation system rooms 108, rooms for network communications 110, and rooms for various other needs and desires 112 of a building owner or occupant. For example, the facility may include a reception area 114 for receiving and assisting guests of the facility or a food area 116 for preparing and distributing food to guests of the facility. The rooms for network communications 110, in particular, may provide voice, data, and/or multimedia communications with a network 118 external to the facility 100, such as the Internet or dedicated communications transmission service, via a wired or wireless communication link 120.

One or more partitioned areas of the facility 100 may include voice enabled system to provide a voice command based on a voice utterance detected in the respective partitioned area, such as a room, by the voice enabled system. The voice enabled system may include a voice enabled device 122 located in each room and a voice processing server (described in more detail below) located remote from the room, which may for example communicate via the network 118. A voice enabled device employed in the embodiments may be an Alexa or Echo device commercially available from Amazon.com, Inc. or other voice enabled device configured as further described herein.

Figure 2:
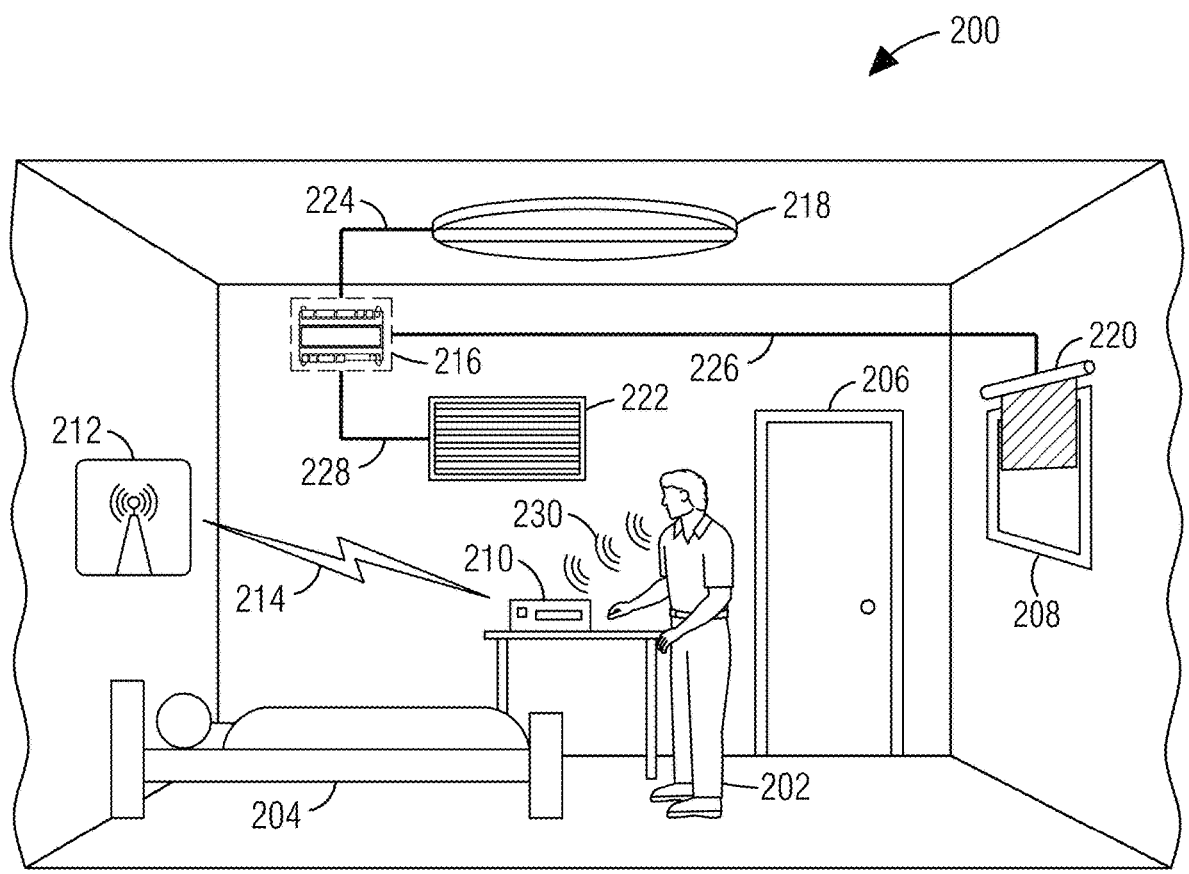
FIG. 2 is an illustration of an example room of the example facility of FIG. 1, in which the example room includes room devices of the building automation system and a voice enabled device of the voice enabled system for implementing a portion of the techniques described herein.

Referring to FIG. 2, there is shown an example guest room 200 of the facility 100, in which the guest room includes rooms devices, such as environmental devices, of the building automation system and a voice enabled device of the voice enabled system for implementing a portion of the techniques described herein. The general system integrates the occupancy and personal preferences of each occupant of a respective guest room 200 in order to facilitate control of the room devices by the occupant or facility personnel via voice utterances. For example, the health information system may provide clinical and administrative data to the building automation system controlling the room devices, such as occupancy information about a guest bed or guest room assigned to a given occupant. The building automation system may best serve the interests of the occupant by controlling the room devices based on information provided by the health information system and stored at the building automation system as well as voice utterances received from the occupant or facility personnel. Examples of facility personnel include, but are not limited to, nurses, cleaning crew members, maintenance technicians, and facility managers.

Room conditions may be changed based on user preferences as identified by a hospitality user profile of the hospitality information system, a guest room profile of the building automation system, a voice profile of the voice enabled system, and/or a voice command based on a voice utterance detected by the voice enabled system. For example, the hospitality user profile may identify an occupant preference for dimmed illumination due to sensitivity to light or guest room availability based on an occupancy schedule for the occupant assigned to the room. As another example, the guest room profile may identify a default preference of an administrator of the building automation system that is triggered based on an occupancy status change indicated by the hospitality user profile. As a further example, preferences may be occupant-specific for a particular guest room, such as patient desires lights-off at 9:00 PM.

The building automation system may receive information associated with a hospitality user profile and/or a voice profile for managing control of devices in a room without knowing the identity of the user/occupant. The system may avoid the distribution of personal identifiable information to the building automation system in violation of data privacy while managing the guest room or space associated with the guest room based on the occupant. For some embodiments, information associated with a hospitality user profile and/or a voice profile may be linked to corresponding information of the building automation system by non-identifying data that does not identify a specific occupant such as room identifier (i.e., room identification), guest type, or location information. For other embodiments, information associated with a hospitality user profile and/or a voice profile may be linked to corresponding information of the building automation system by a group voice profile that is not specific to a particular occupant, such as a voice profile associated with the building automation system, the hospitality information system, or an entity associated with the facility. For yet other embodiments, information associated with a hospitality user profile and/or a voice profile may be correlated with corresponding information of the building automation system to control devices of the guest rooms.

The guest room 200 of FIG. 2 is setup for the needs and comforts of a guest or occupant 202, such as the inclusion of furniture 204. In setting-up the guest room 200, the room may also include a portal 206 for passage of the occupant 202 in and out of the room as well as a window 208 for passage of illumination in and out of the room. The guest room 200 may further include a voice enabled device 210 of a voice enabled system for receiving a voice utterance in the room so that the voice enabled system may provide a voice command based on the voice utterance. For example, the voice enabled device 210 may detect the voice utterance in the guest room 200 and communicate a voice signal corresponding to the voice utterance to a remote voice processing server of the voice enabled system via a communication component 212 located in the room. An example of a communication component 212 is a wireless access point having a wired or wireless connection to a building automation system at a building automation system room 108 of the facility 100 in which the voice enabled device 210 may communicate the voice signal to the communication component 212 via a wireless link 214. The voice enabled device 210 may also be coupled to the communication component 212 via a wired connection, such as an Ethernet connection.

The guest room 200 may also include a room automation controller or station 216 of the building automation system for coupling directly or indirectly other components of the building automation system, such as one or more room devices, such as environmental devices of the room. Examples of the room devices includes, but are not limited to, a light control device such as a light fixture controller 218 or a window shade controller 220 or a temperature control device such as a thermostat or an air vent 222. Other examples of room devices include, but are not limited to, non-environmental devices such as entertainment systems that may be controlled by a building automation system to provide further room control. Each room device 218-222 may be coupled to the room automation station 216 directly or indirectly via a wired or wireless connection 224-228.

As stated above, a voice enabled device 210 located in the guest room 200 may receive a voice utterance 230 in the room so that the voice enabled system may provide a voice command based on the voice utterance. To setup or commission the voice enabled system, including the voice enabled device 210 and the remote voice processing server (such as server 304 described herein), an administrator for the building automation system may assigned or specify preferences per guest room 202 to be used by the building automation system to control environmental devices in the guest room 202 for a corresponding predetermined period of time. The preferences may identify capabilities of the room devices 218-222. The preferences are captured and stored in a voice profile of the voice enabled system that corresponds to the applicable guest room 202. The voice profile of the voice enabled system may also include skill codes for the administrator, facility personnel, and/or occupant for awakening the associated voice enabled device of the voice enabled system for commissioning, configuring, or otherwise providing requests to the voice enabled system and the other systems connected to it.

Figure 3:
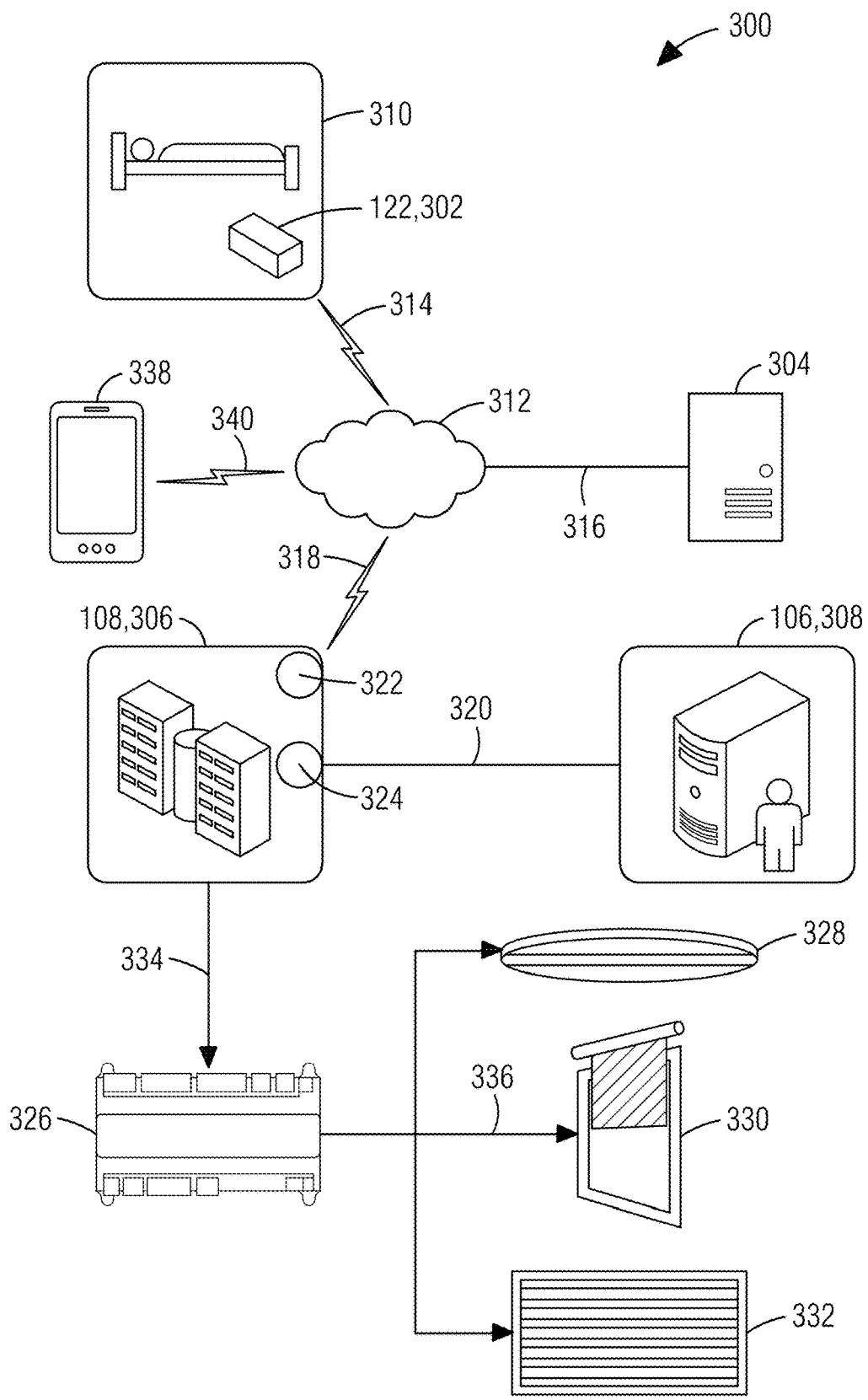
FIG. 3 is a diagram representing of an example system that utilizes the building automation system, the voice enabled system, the hospitality information system, a mobile device, and communication links for implementing the techniques described herein.

Referring to FIG. 3, there is shown is a diagram representing an example system 300 for controlling environmental conditions of a room. The system 300 utilizes a voice enabled system comprising at least the voice enabled device 302 and the voice processing server 304, and the system also comprises a building automation system 306 and a hospitality information system 308 for implementing the techniques described herein. For the system 300, the voice enabled system includes a voice enabled device 302 that is located in a guest room 310 and a voice processing server 304 that is located remote from the guest room, such as outside of the facility 100 where the voice enabled system is located. For some embodiments, the voice enabled device 302 communicates with a communication network 312 via a first wired or wireless link 314. The communication network 312 provides communications outside of the facility 100, connecting to external networks such as the Internet, so at least a portion of the communication network is located outside of the facility. The voice processing server 304 may communicate with the communication network 312 via a second wired or wireless link 316, and the building automation system 306 may communicate with the communication network via a third wired or wireless link 318. The hospitality information system 308 may communicate with the building automation system 306 via a fourth wired or wireless link 320, which may utilize or avoid a direct link with the communication network 312.

The system 300 for controlling environmental conditions of the guest room 310 comprises the voice enabled system 302, 304, the building automation system 306, and the hospitality information system 308. The voice enabled system 302, 304 is associated with the guest room 310 and is configured to provide a voice command based on a voice utterance detected in the room by the voice enabled system. The hospitality information system 308 is associated with the guest room 310 and includes a hospitality user profile that identifies one or more user parameters associated with the room. The building automation system 306 includes a first interface 322 operatively coupled to the voice enabled system 302, 304 directly or via the communication network 312, and the first interface is configured to receive the voice command from the voice enabled system. The building automation system 306 also includes a second interface 324 operatively coupled to the hospitality information system 308 directly or via the communication network 312, and the second interface is configured to receive from the hospitality information system a hospitality user profile identifying one or more user parameters associated with the room.

The building automation system 306 includes one or more room automation controllers or stations 326 to couple directly or indirectly other components of the building automation system, such as one or more room devices 328-323, such as environmental devices, of the guest room 310. Examples of the room devices includes, but are not limited to, a light control device such as a light fixture controller 328 or a window shade controller 330 or a temperature control device such as a thermostat or an air vent 332. Other examples of room devices include, but are not limited to, non-environmental devices such as entertainment systems that may be controlled by a building automation system to provide further room control. A managing device of the building automation system 306 may be coupled directly or indirectly to a room automation station 326 via wired or wireless link 334, and each room device 328-332 may be coupled to the room automation station 326 directly or indirectly via one or more wired or wireless connections 336.

As stated above, the voice enabled system includes a voice enabled device 302 located in a guest room 310 and a voice processing server 304 located remote from the guest room. An administrator of the building automation system 306 may utilize a terminal, such as a managing device, to communicate with the voice processing server 304 and setup an account at the server. The account at the voice processing server 304 may include information about each voice enabled device 302 of the voice enabled system and a corresponding location for each voice enabled device, such as identification of the guest room 310 of the facility 100. The administrator may also utilize the terminal to scan a group of voice enabled devices 302 and label these devices in the account at the voice processing server 304 in a way that is logical, such as Patient_room_102a, Patient_room_102b, Public_area_lobby, Public_area_waiting_room_114, etc. The administrator may then enable at the terminal what skills to allow for each group of voice enabled devices 302. For example, the administrator may acquire an entertainment option for the public areas so a particular skill of the voice enabled system may be enabled for a group of voice enabled devices 302 in a particular public area of the facility 100. In the same manner, the administrator may utilize the terminal to link a room or facility related skill of the voice enabled system to an individual voice enabled device of a particular guest room 310 or a group of devices for a particular area of the particular guest room or a particular area of the facility 100.

To the end user, whether the administrator, facility personnel, or occupant, the voice enabled system 302, 304 acts upon his or her requests and forwards the requests to the building automation system 306, which adjusts the room device or devices 328-332 in a simple, seamless manner. The end user may provide a voice utterance that may be recognized by the voice enabled system as a request to control one or more room devices 328-332, as specified by the voice profile of the voice enabled system. For example, the voice enabled device 302 may wake-up in response to receipt and recognition of an activating phrase and transmit a voice utterance associated with the activating phrase to the remote voice processing server 304. The voice processing server 304 identifies the building automation system 306 associated with the voice enabled system and generates a coded message including an appropriate voice command to the building automation system. The building automation system 306 processes the voice command and instructs the room automation station 326 of the guest room 310 to control the room devices 328-332 in accordance with the voice utterance received by the voice enabled device 302. Thereafter, the building automation system 306 may send a response signal to the voice processing server 304 in response to providing the instructions to the room automation station 326 and, in turn, the voice processing server 304 may send the same or similar signal to the voice enabled device 302 so that the device may provide a confirmation message to the occupant and/or other people in the guest room 310.

The voice enabled system 302, 304 may also be commissioned and/or configured with the building automation system 306 by the administrator. For example, the administrator may utilize a mobile device 338 having a facility administration application within the guest room 200 to scan a code, such as a bar code or QR code, in the room. The mobile device 338 may send commissioning or configuration information to other components of the building automation system 306 via a fifth wired or wireless link 340 which, for some embodiment, may traverse the communication network 312.

Figure 4:
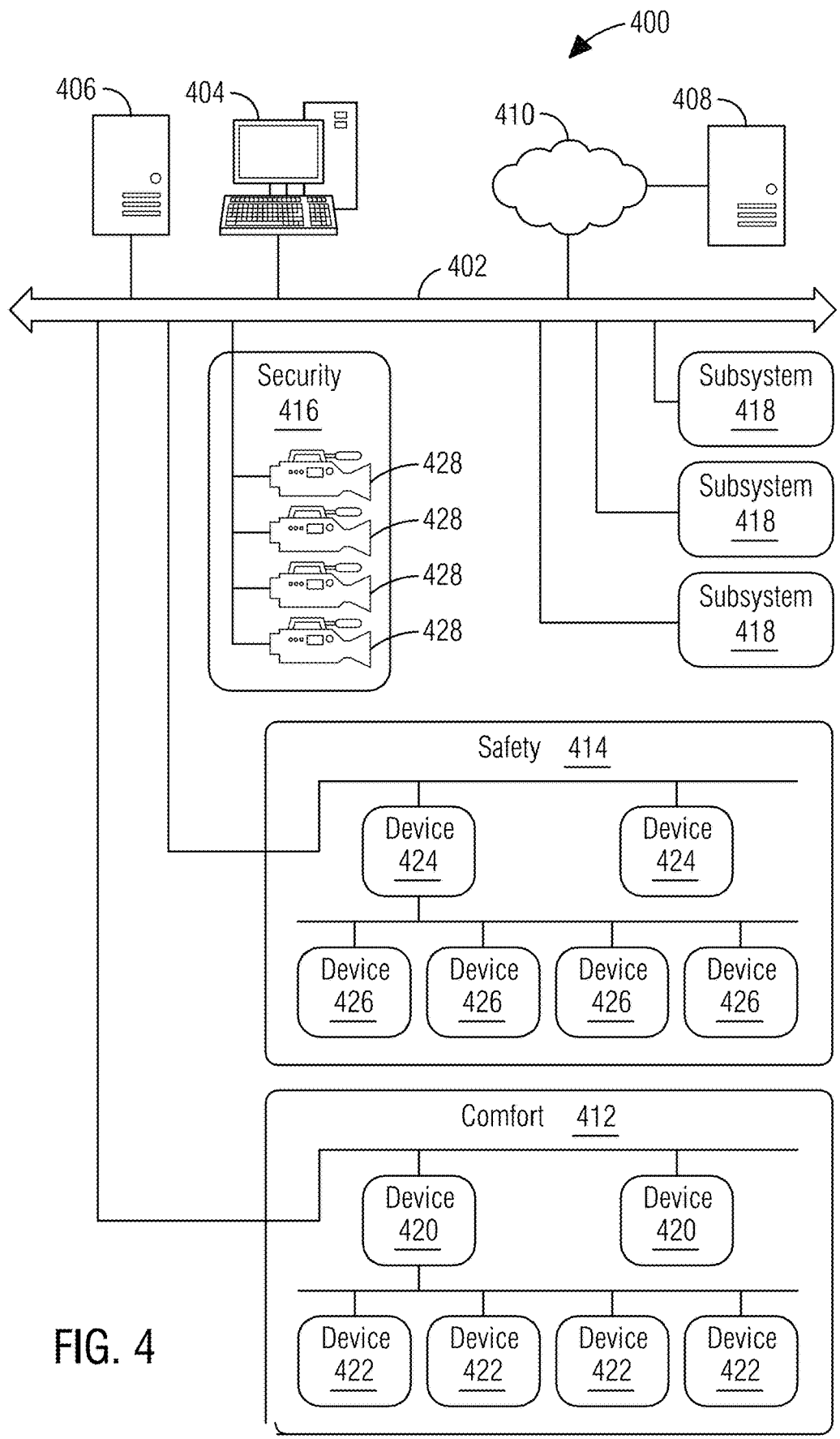
FIG. 4 is a block diagram representing an example implementation of the building automation system of the example system of FIG. 3.

Referring to FIG. 4, there is shown is a block diagram representing an example implementation of the building automation system. The building automation system 400 is an environmental control system configured to control one or more environmental parameters for a building, such as temperature, humidity, ventilation, lighting, fire safety, security, and the like. For example, the building automation system 400 may comprise one or more network connections or buses 402 for connectivity of devices within the system. For one embodiment, the example building automation system 400 may comprise one or more management devices, such as a management workstation 404, a management server 406, or a remote management device 408 connecting through a wired or wireless network connection 410, that allows the setting and/or changing of various controls of the system. While a brief description of the building automation system 400 is provided below, it will be understood that the building automation system 400 described herein is only one example of a particular form or configuration for a building automation system and that the system 100 may be implemented in any other suitable manner without departing from the scope of this disclosure.

The management devices 404, 406, 408, are configured to provide overall control and monitoring of the building automation system 400. For the illustrated embodiment of FIG. 4, the building automation system 400 provides connectivity to subsystems for various environmental parameters such as components of comfort systems 412, safety systems 414, security systems 416, and other systems 418. For example, comfort systems 412 may include various devices 420, 422 for monitoring and controlling heating, cooling, and ventilation of areas within a building or group of buildings. Examples of comfort devices include, but are not limited to, stations, field panels, field controllers, field devices, room automation controllers or stations, and the like. Some devices 420 may communicate directly with a network connection or bus 402, whereas other devices 422 may communicate through, and perhaps be controlled by, another device. Similarly, safety systems 414 may include various devices 424, 426 for monitoring and controlling fire protection for areas within a building or a group of buildings. Examples of safety devices include, but are not limited to controllers, control panels, fire and smoke detectors, alarm notification appliances and systems, video surveillance cameras, and the like. Similar to comfort devices, some safety devices 424 may communicate directly with a network connection or bus 402, whereas other safety devices 426 may communicate through, and perhaps be controlled by, another device. Further, the illustrated embodiment of the building automation system 400 may provide southbound connectivity to subsystems 428 for security systems 416, such as video surveillance cameras and motion detectors, for monitoring and controlling various areas within a building or a group of buildings, as well as other types of subsystems 418. The subsystems 418-428 may include legacy or 3rd party devices to be integrated with other devices of the building automation system 400. It is to be understood that the system 400 may comprise any suitable number of any of components 420-428 based on the particular configuration for each building or group of buildings.

Figure 5:
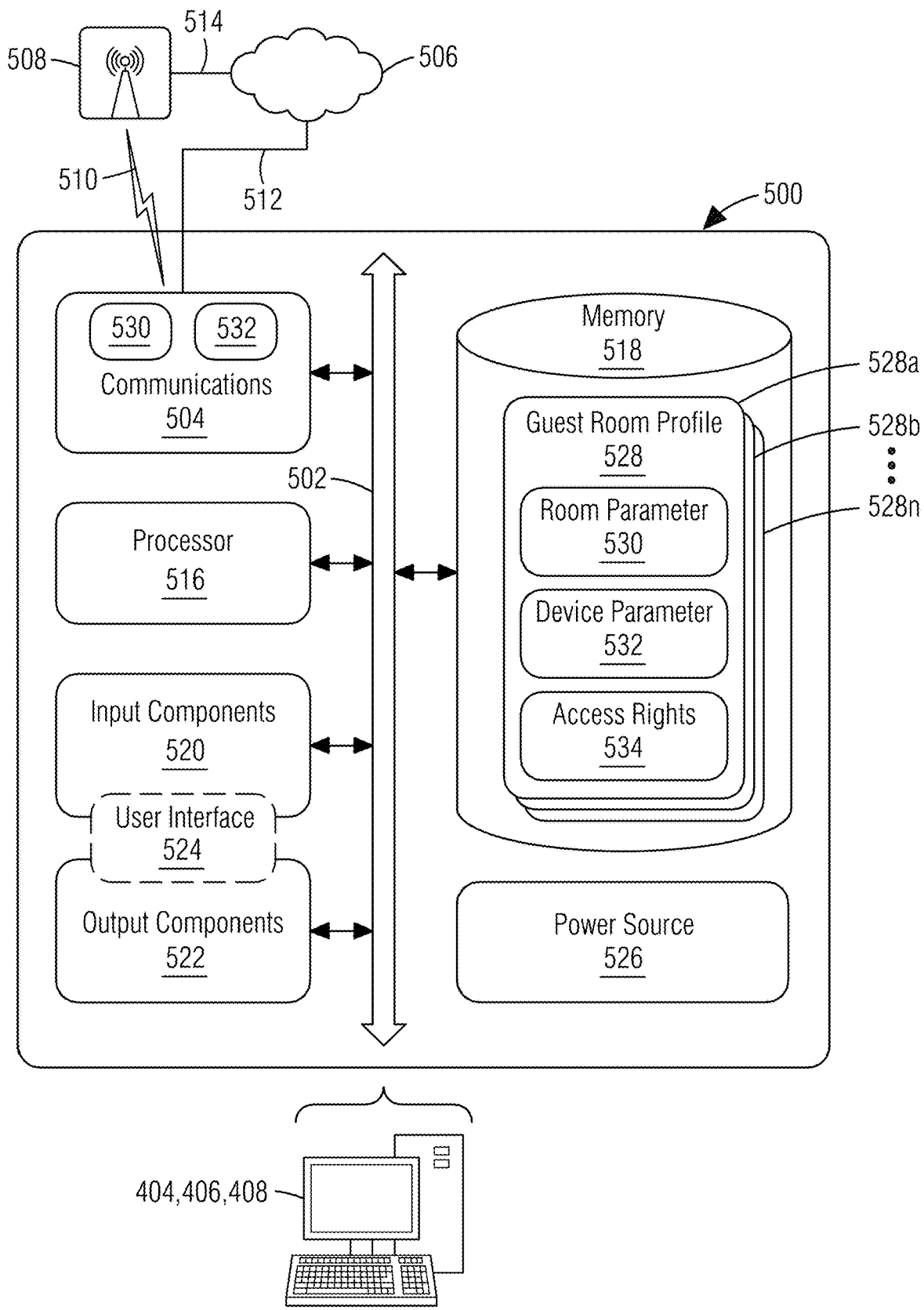
FIG. 5 is a block diagram representing an example management device of the building automation system of FIG. 4.

FIG. 5 represents an example management device, such as the devices 404, 406, 408 represented by FIG. 4, of the building automation system 400. Components of the management device 500 comprise a communication data bus 502 and a communication component 504. The communication component 504 may utilize wireless or wired technology to communicate directly or indirectly with a communication network 506, such as the Internet. For example, the communication component 504 may communicate with an access point 508 via wireless link 510 that, in turn, communicates via a wired or wireless link with the communication network 506. The communication component 504 may also, or in the alternative, communicate directly with the communication network via a wired link 512. The communication component 504 of the device components 500 may utilize wireless technology, such as, but are not limited to, satellite-based and cellular-based communications and their variants as well as wireless local area network (WLAN) communication and their variants, such as infrastructure, peer-to-peer, ad hoc, bridge, and wireless distribution-based communications. Examples of WLAN communications include, but are not limited to, IEEE 802.11 (Wi-Fi), IEEE 802.16 (WiMAX), Bluetooth, BLE, and ZigBee. Wireless technology may further include other forms of communication such as microwave or infrared technology (IR). The communication component 504 of the device components 500 may utilize, in addition to or in the alternative to wired technology, wired technology for communication such as any type of transmission of data over a physical conduit, such as an electrical cable or optical fiber cable.

The device components 500 also comprise one or more processors 516, one or more memory components 518, input components 520, output components 522, and a power source 526. The processor 516 may execute code and process data received from other components of the device components 500, such as information received at the communication component 504 or stored at the memory component 518. The code associated with the building automation system 400 and stored by the memory component 518 may include, but is not limited to, operating systems, applications, device drivers, and the like. Each operating system includes executable code that controls basic functions of each device, such as interactions among the various components of the device components 500, communication with external devices via communication components 504, and storage and retrieval of code and data to and from the memory component 518. Each application includes executable code to provide specific functionality for the processor 516 and/or remainder of the corresponding device. For example, the building automation system may include a voice application to interface with the voice enabled server 304 and configure and/or commission the building automation system based on the configuring and/or commissioning of the voice enabled server. Data is information that may be referenced and/or manipulated by an operating system or application for performing functions of the device.

The input components 520 of the device components 500 may include various types of video input components, audio input components, and mechanical input components. Examples of input components 520 include, but are not limited to, keyboard, mouse, touchscreen, touchpad, microphone, and other types of sensors. Likewise, the output components 522 of the device components 500 may include a variety of video, audio and/or mechanical outputs. Examples of output components 522 is, but is not limited to, displays, speakers, touchscreen, vibrators, and other types of indicators. The device components 500 may also include a user interface 524 that is a subset of input components 520 and/or output components 522 for interaction with an operator, installer, or technician of the device.

The device components 500 may further comprise a power source 526, such as a power supply or a portable battery, where the device having the components 500 is disposed. The power source 526 may also provide power to the other device components 500 of each device of the building management system 400, if necessary or desired.

The memory component 518 may also store data associated with the building automation system 400 including, but is not limited to, guest room profiles 528 and the like. The guest room profile 528 include one room parameter 530 such as a room identifier or a room status. Examples of the room identifier include, but are not limited to, a room location such as a building identifier, level identifier, room coordinates, or room number as well as a sub-room location such as a bed location or partitioned area. Examples of the room status include, but are not limited to, designations such as closed, housekeeping, isolated, contaminated, occupied, or unoccupied. The guest room profile 528 may also, or in the alternative, include a room device parameter 532 such as a room device identifier, a room device operation, or a room device activation. For example, the room device identifier may be associated with a location of a room device or otherwise distinguish from other devices in the room, the room device operation may be associated with one or more functional parameters of the device, and the room device activation may be associated with one or more triggers to activate a function of the device.

The guest room profile 528 also include other information to facilitate control of one or more room devices based on voice commands. For example, the guest room profile may include access rights 534 identifying user types with various rights to the building automation system 400. For some embodiments, the guest room profile 528 may include one or more access rights to the building automation system 400 associated with the occupant of the guest room. For other embodiments, the guest room profile 528 may include an administrator right and a default user right as well as the access right(s) of the occupant of the guest room. The access rights stored by the system user profile 528 may or may not reveal an identity of the occupant. Other examples of the data included in the guest room profile 528 include, but are not limited to, a global user right, a local operation system user right, a local business automation system user right, a read only right, and a read/write right. For yet other embodiments, the guest room profile 528 may include multiple guest room profiles (528a, 528b, . . . 528n) corresponding to each guest room.

As described above, the general system correlates or unifies at least a portion of the guest room profile 528 with at least a portion of the hospitality user profile and/or the voice profile. The building automation system may receive information associated with a hospitality user profile and/or a voice profile for managing control of devices in a room without knowing the identity of the user/occupant. The system may avoid the distribution of personal identifiable information to the building automation system, thus avoiding violation of data privacy, while managing the guest room or space associated with the guest room based on the occupant. Since many parameters of the guest room profile 528 (if not all) do not identify a specific occupant, one or more room parameters 530, device parameters 532, or access rights 534 of the guest room profile may be used to linked, and thus correlate or unify, corresponding parameters of the hospitality user profile and/or the voice profile without exposing the identity of the specific occupant.

The communication component 504 of the device components 500 may include a first interface 530 and a second interface 532. The first interface 530 is operatively coupled to the voice enabled system associated with the room and is configured to receive a voice command based on a voice utterance detected in the room by the voice enabled system. The second interface 532 is operatively coupled to the hospitality information system associated with the room and is configured to receive a hospitality user profile from the hospitality information system. Each of the first and second interfaces 530, 532 is associated with each guest room of the facility that includes a voice enabled device of the voice enabled system. Each of the first and second interfaces 530, 532 may be associated with a software component that interfaces with the voice enabled system or multiple software components in which each software component is associated with each voice enabled device of the voice enabled system.

Figure 6:
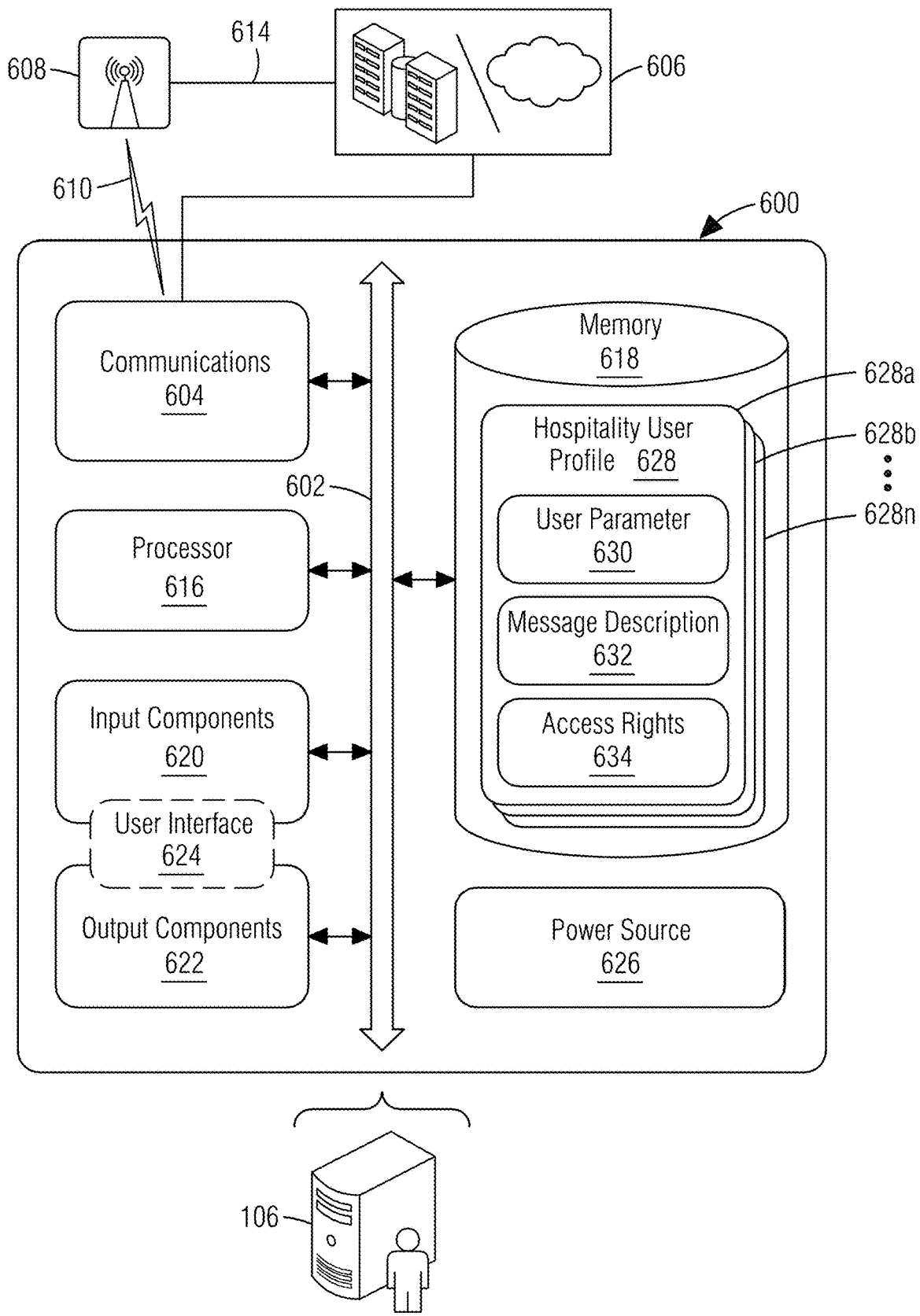
FIG. 6 is a block diagram representing an example implementation of a hospitality information system of the example system of FIG. 3.

Referring to FIG. 6, there is shown example system components 600 of a hospitality information system, such as the hospitality information system 106 of FIG. 1. The system components 600 comprise a communication data bus 602 and a communication component 604. The communication component 604 may utilize wireless or wired technology to communicate directly or indirectly with a building automation system or a communication network 606, such as the Internet. For example, the communication component 604 may communicate with an access point 608 via wireless link 610 that, in turn, communicates via a wired or wireless link with the building automation system or the communication network 606. The communication component 604 may also, or in the alternative, communicate directly with the building automation system or the communication network 606 via a wired link 612. The communication component 604 of the system components 600 may utilize wireless or wired technology, as described above for the device components 500 of the example management device.

The system components 600 also comprise one or more processors 616, one or more memory components 618, input components 620, output components 622, and a power source 626. The processor 616 may execute code and process data received from other components of the system components 600, such as information received at the communication component 604 or stored at the memory component 618. The code associated with the hospitality information system and stored by the memory component 618 may include, but is not limited to, operating systems, applications, device drivers, and the like. Each operating system includes executable code that controls basic functions of each system, such as interactions among the various components of the system components 600, communication with external devices via communication components 604, and storage and retrieval of code and data to and from the memory component 618. Each application includes executable code to provide specific functionality for the processor 616 and/or remainder of the corresponding system. For example, the hospitality information system may include a specific hospitality application to generate, communicate, or otherwise support the sharing of information with the building automation system and/or voice enabled system. Data is information that may be referenced and/or manipulated by an operating system or application for performing functions of the system.

The input components 620 of the system components 600 may include various types of video input components, audio input components, and mechanical input components. Examples of input components 620 include, but are not limited to, keyboard, mouse, touchscreen, touchpad, microphone, and other types of sensors. Likewise, the output components 622 of the system components 600 may include a variety of video, audio and/or mechanical outputs. Examples of output components 622 is, but is not limited to, displays, speakers, touchscreen, vibrators, and other types of indicators. The system components 600 may also include the user interface 624 that is a subset of input components 620 and/or output components 622 for interaction with an operator, installer, or technician of the system.

The system components 600 may further comprise a power source 626, such as a power supply or a portable battery, where the system having the components 600 is disposed. The power source 626 may also provide power to the other system components 600 of the hospitality information system, if necessary or desired.

The memory component 618 may also store data associated with the hospitality information system including, but is not limited to, hospitality user profiles 628 and the like. The hospitality user profile 628 may include one or more user parameters 630 associated with a guest room such as a room identifier, a room status, a reservation specification, a membership specification, a laboratory service, or a clinical treatment. Examples of the room identifier include, but are not limited to, a room location such as a building identifier, level identifier, room coordinates, or room number as well as a sub-room location such as a bed location or partitioned area. For example, the room identifier may include data associated with a point, or location of a point, of the building automation system. Examples of the room status include, but are not limited to, designations such as closed, housekeeping, isolated, contaminated, occupied, or unoccupied. For example, the room status may include an occupancy parameter and/or a scheduling parameter, which may be determined from time periods of occupancy by an occupant of the particular guest room. Examples of clinical treatment parameters includes, but are not limited to, information collected in case sheets, notes, and reports generated by medical personnel, such as doctors, nurses, and technicians, associated with diagnostic tests, medical imaging, phlebotomy, cardiology, radiology, and the like.

The hospitality user profile 628 may include other user parameters 630, such as patient information, administrative information, pharmaceutical information, and resource information. Patient information may include historical and episodical views of patient symptoms and illnesses. Administrative information may include doctor availability, text procedures, tariffs, itemization of services rendered. Pharmaceutical information may include medical drugs allowed/not allowed for a particular patient, availability of medical drugs, and administration (identification, time, quantity, and circumstances) for medical drugs to the particular patient. Resource information may include for tracking and otherwise managing medical equipment and supplies. For yet other embodiments, the hospitality user profile 628 may include multiple hospitality user profiles (628a, 628b, . . . 628n) corresponding to each guest room.

Many parameters, if not all, of the hospitality user profile 628 do not include occupant information. A portion of the hospitality user profile 628, i.e., one or more user parameters 630, may be used to linked, and thus correlate or unify, a corresponding portion (i.e., room or device parameters 530, 532 and/or access rights 534) of the guest room profile 528 and/or the voice profile without exposing the identity of any occupants. The hospitality information system may provide information associated with a guest room profile and/or a voice profile for managing control of devices in a room without knowing the identity of the user/occupant. The system may avoid the distribution of personal identifiable information to the building automation system, thus avoiding violation of data privacy, while managing the guest room or space associated with the guest room based on the user/occupant.

The hospitality user profile 628 may further include a set of hospitality-related messages that have been analyzed for a particular user parameter. In particular, the set of hospitality-related messages may include a message description 632, one or more user parameter groupings (which may be stored with the user parameters 630), and/or access rights 634 of various user types. Examples of the message description 632 include data format, data semantics, and message acknowledgment responsibilities. Examples of user parameter groupings 630 include laboratory service, medications, care plans, diagnostic reporting, and the like. Examples of user types having varying access rights 634 include an administrator, a practitioner, an organization, an observer, and a patient.

Figure 7:
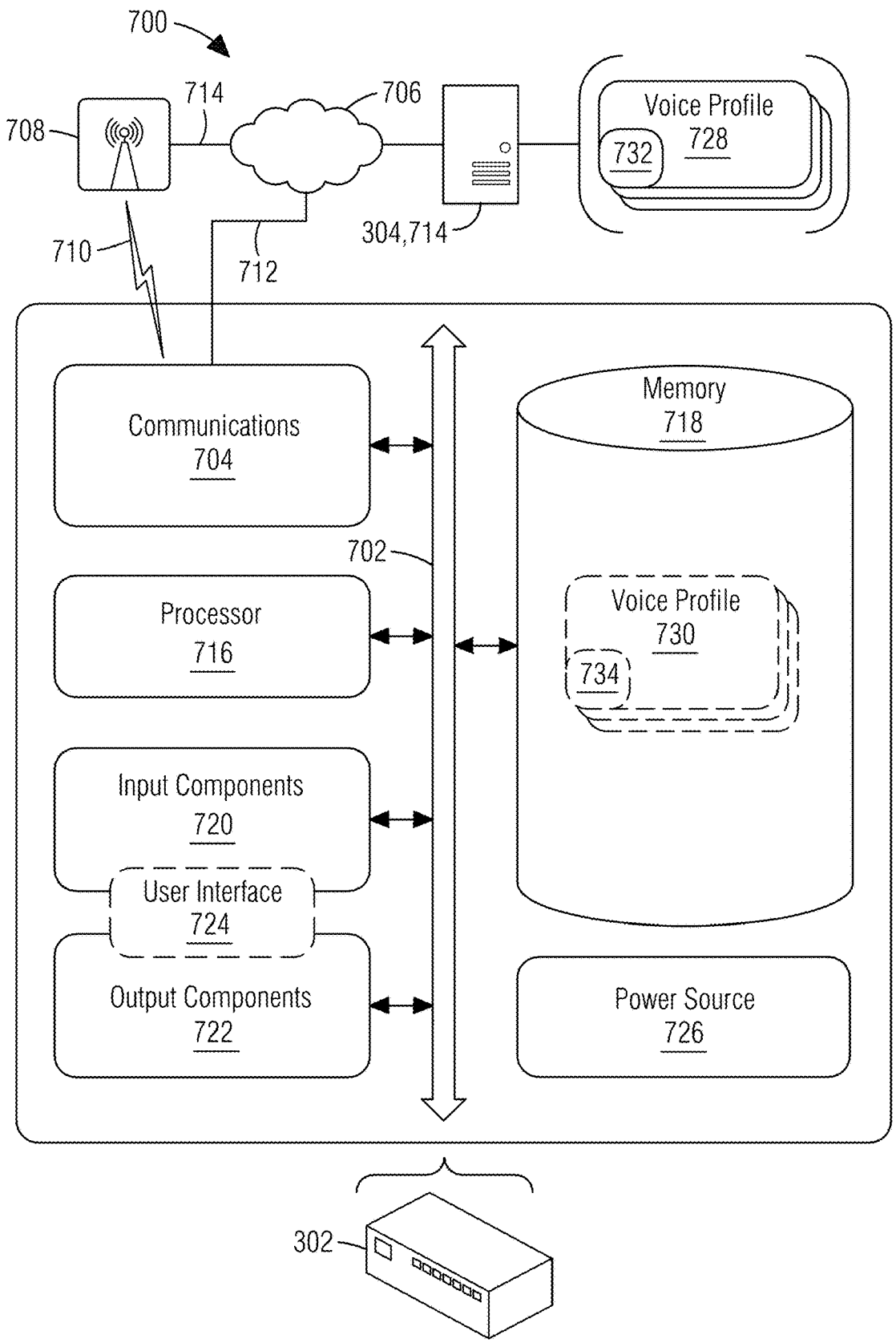
FIG. 7 is a block diagram representing an example implementation of a voice enabled system of the example system of FIG. 3.

Referring to FIG. 7, there is shown example device components 700 of a voice enabled device of a voice enabled system, such as the voice enabled system 302, 304 of FIG. 3. The device components 700 of the voice enabled device 302 comprise a communication data bus 702 and a communication component 704. The communication component 704 may utilize wireless or wired technology to communicate directly or indirectly with a communication network 706, such as the Internet. For example, the communication component 704 may communicate with an access point 708 via wireless link 710 that, in turn, communicates via a wired or wireless link with the communication network 706. The communication component 704 may also, or in the alternative, communicate directly with the communication network via a wired link 712. The communication component 704 of the device components 700 may utilize wireless or wired technology, as described above for the device components 500 of the example management device. FIG. 7 also represents a voice processing service 714 of the voice enabled system communicating with the communication network 706.

The device components 700 also comprise one or more processors 716, one or more memory components 718, input components 720, output components 722, and a power source 726. The processor 716 may execute code and process data received from other components of the device components 700, such as information received at the communication component 704 or stored at the memory component 718. The code associated with the voice enabled system and stored by the memory component 718 may include, but is not limited to, operating systems, applications, device drivers, and the like. Each operating system includes executable code that controls basic functions of each system, such as interactions among the various components of the device components 700, communication with external devices via communication components 704, and storage and retrieval of code and data to and from the memory component 718. Each application includes executable code to provide specific functionality for the processor 716 and/or remainder of the corresponding system. Data is information that may be referenced and/or manipulated by an operating system or application for performing functions of the system.

The input components 720 of the device components 700 may include various types of video input components, audio input components, and mechanical input components. The input components 720 of the voice enabled system include an audio input component, such as a microphone, and the device components may include other input components such as, but are not limited to, keyboard, mouse, touchscreen, touchpad, and other types of sensors. Likewise, the output components 722 of the device components 700 may include a variety of video, audio and/or mechanical outputs. For some embodiments, the output components 722 include an audio output component, such as a speaker. In addition, or alternative, to the audio output component, the output components 72 may include, but is not limited to, displays, touchscreen, vibrators, and other types of indicators. The device components 700 may also include a user interface 824 that is a subset of input components 820 and/or output components 822 for interaction with an operator, installer, or technician of the system.

The device components 700 may further comprise a power source 726, such as a power supply or a portable battery, where the system having the components 700 is disposed. The power source 726 may also provide power to the other device components 700 of the voice enabled system, if necessary or desired.

A memory component of the voice enabled server and/or the memory component 718 of the voice enabled device may store data associated with the voice enabled system including, but is not limited to, one or more voice profiles 728, 730 and the like. A voice profile 728 may be stored at the voice enabled server, a voice profile 730 may be stored at the voice enabled device, or voice profiles 728, 730 may be stored in part or in whole at both the server and the device. The voice profile 728, 730 may include settings of the voice enabled device including a wake word, address, time zone, and units of measurement. The voice profile 728, 730 includes data that may simplify the process of creating and managing rooms. For example, the voice profile 728, 730 may be created to include settings of a group of voice enabled devices or all voice enabled devices having one or more common attributes. For some embodiments, the voice enabled system may include a voice profile that identifies one or more voice parameters of a room group or type, an allowed set of voice command, an allowed set of voice utterances, administrator parameters, and a wake word parameter. Examples of the room type include, but are not limited to, patient room, operating room, waiting room, office, guest room, reception desk, and the like.

The voice profiles 728, 730 of the voice enabled system may include one or more voice parameters 732, 734 associated with a guest room such as a room identifier and/or a room status. Examples of the room identifier include, but are not limited to, a room location such as a building identifier, level identifier, room coordinates, or room number as well as a sub-room location such as a bed location or partitioned area. For example, the room identifier may include data associated with a point, or location of a point, of the building automation system. Examples of the room status include, but are not limited to, designations such as closed, housekeeping, isolated, contaminated, occupied, or unoccupied.

It should be noted that the voice enabled system may include a large repertoire of potential phrases, also known as utterances, that may be received and interpreted. The beginning of each phrase may include an activating phrase to "awaken" the voice enabled system and a subsequent portion of each phrase may include information about the action to be taken by a particular voice enabled device associated with and located in a particular guest room. For example, a user may provide a voice utterance to the voice enabled system to control a room temperature of the room by requesting a current room temperature, setting the room temperature, commanding a cooler or warmer temperature, specifying a particular temperature, or specifying a particular change in temperature. As another example, the user may provide voice input to control a window shade position by requesting a current shade position, setting a shade position, commanding a greater or lesser amount of shade, specifying a particular shade position, or specifying a particular change in shade position. If more than one shade is associated with the room, then the user may further specify the particular shade or shades to be operated within the same command or by separate commands. For yet another example, the user may provide voice input to control illumination within the room by requesting a current lighting level, setting a current lighting level, commanding a greater or lesser lighting level, specifying a particular lighting level, or specifying a particular change in lighting level. If more than one light source is associated with the room, then the user may further specify the particular light source or sources to be operated within the same command or by separate commands.

Figure 8:
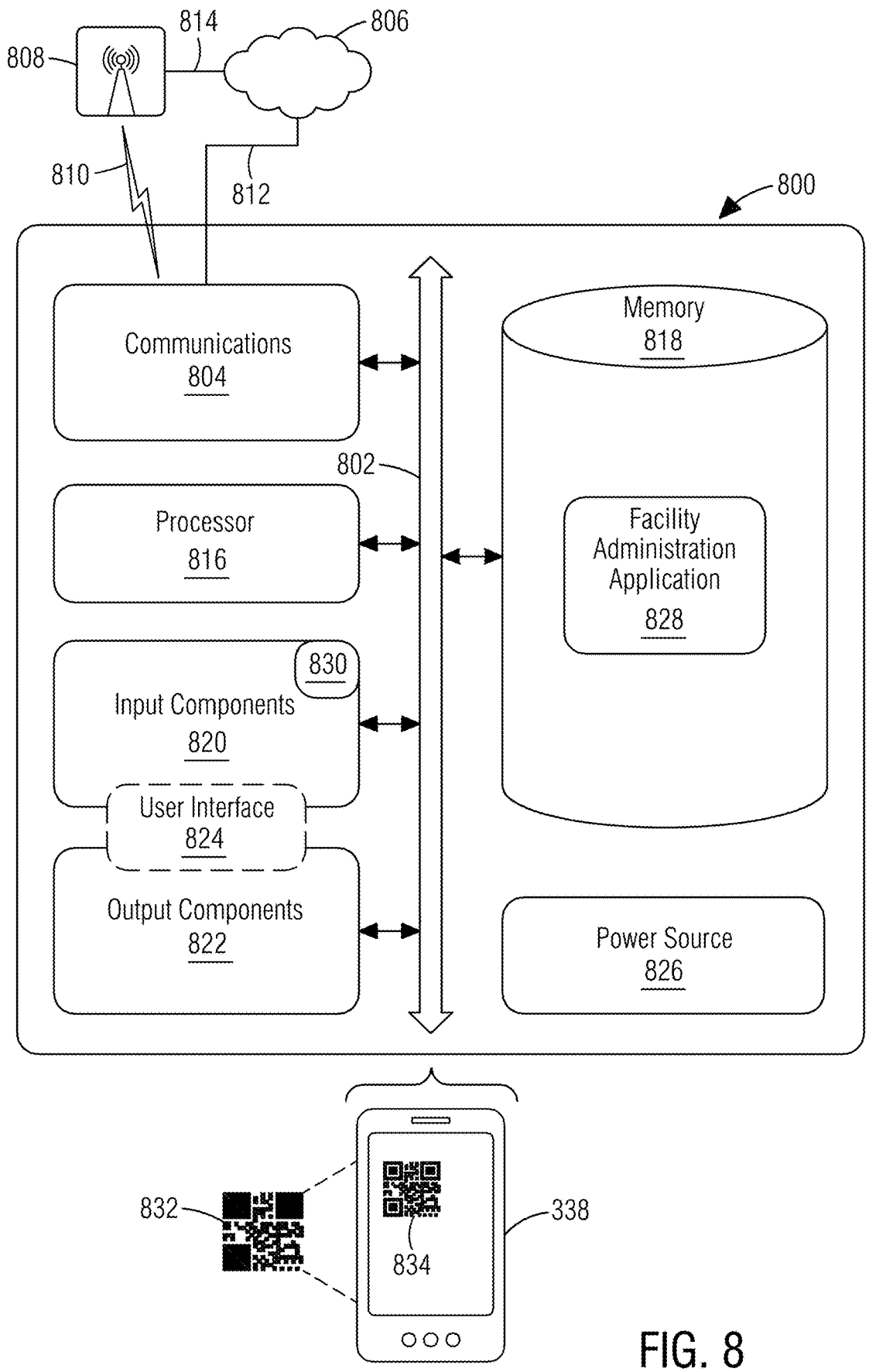
FIG. 8 is a block diagram representing an example implementation of a mobile device of the example system of FIG. 3.

Referring to FIG. 8, there is shown example device components 800 of a mobile device that may be used to commission, configure, and/or operate the system described herein. The device components 800 comprise a communication data bus 802, a communication component 804, one or more processors 816, one or more memory components 818, input components 820, output components 822, a user interface 824, and a power source 826. The communication component 804 may communicate with a communication network 806 indirectly, such as via an access point 808 and wireless link 810 thereto, and/or directly, such as via a wired link 812. The input components 820 and the output components 822 may include various types of video, audio, and mechanical components. The input components 820 of the voice enabled system include an audio input component. The device components 800 may also include a user interface 824 that is a subset of input components 820 and/or output components 822 for interaction with an operator, installer, or technician of the system.

The memory component 818 may also store application associated with certain features of the mobile device, such as a facility administration application 828. The facility administration application 828 may operate in conjunction with various components of the mobile device, including a sensor 830 of the input components 820, to read a code located in a particular guest room and provide information to the managing device of the building automation system to assist with commissioning and/or configuring one or more devices in the particular guest room.

Referring to FIG. 3 in conjunction with FIG. 8, the voice enabled system 302, 304 may be commissioned and/or configured with the building automation system 306 by the administrator. In particular, the administrator may utilize a mobile device 338 having a facility administration application 828 within the guest room 200 to scan a code 832. For example, the facility administration application may operate in conjunction with a bar code reader of the mobile device 338 to scan a bar code or QR code, in the room. Visual feedback 834 associated with the code 832 scanned by the sensor 830 of the mobile device, such as an imager, may appear at an output component 822 or user interface 824 of the mobile device 338. Thereafter, the mobile device 338 may send commissioning or configuration information via the communication component 804 to other components of the building automation system.

Figure 9:
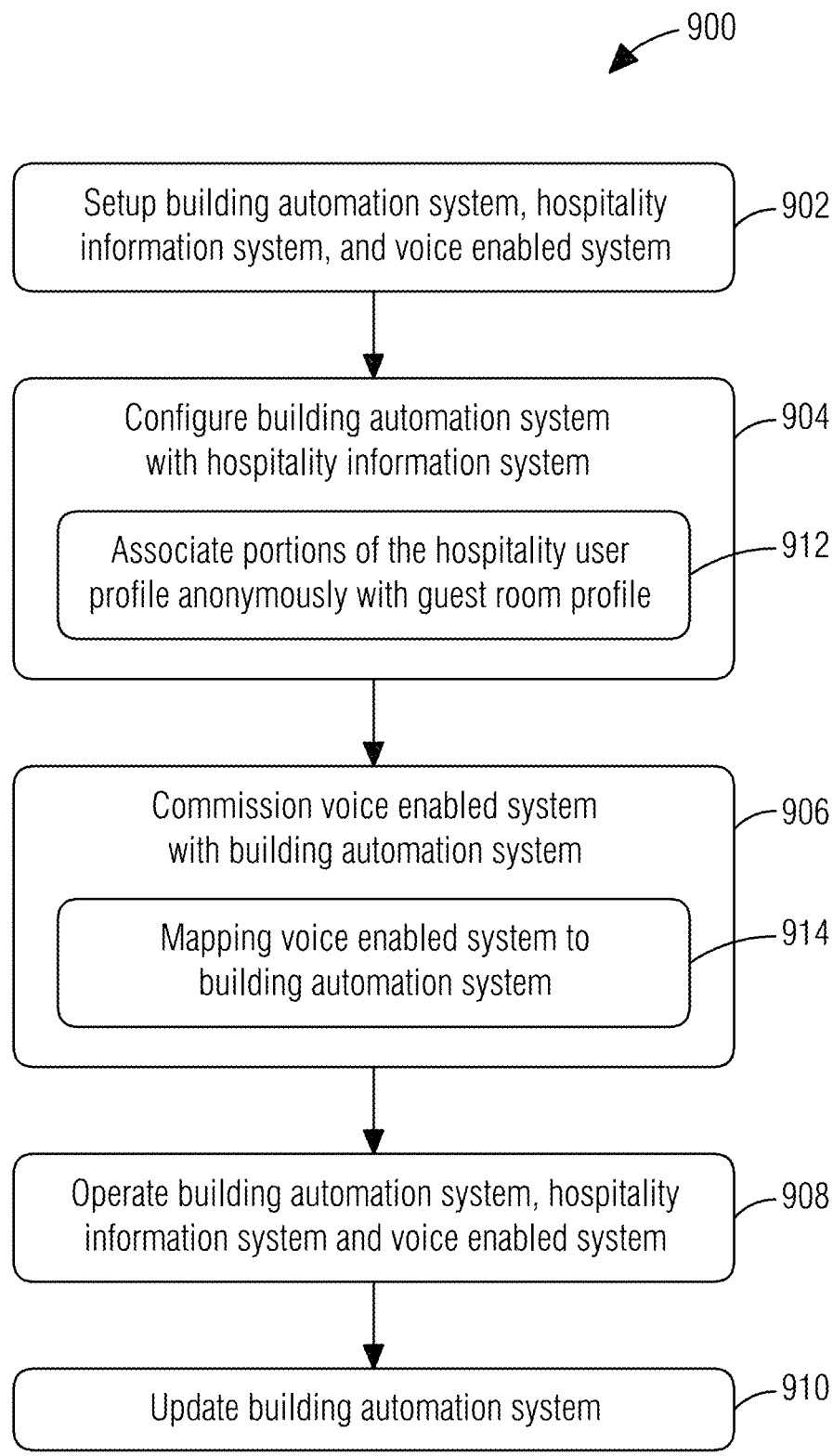
FIG. 9 is a flow chart representing an example workflow of a system that utilizes the building automation system, the hospitality information system, and the voice enabled system for implementing the techniques described herein.

Referring to FIG. 9, there is shown a flow chart representing an example workflow of a general system that utilizes the building automation system, the hospitality information system, and the voice enabled system for implementing the techniques described herein. The building automation system, the hospitality information system, and the voice enabled system may be setup 902 at a facility 100, such as a hospital or hotel. The system may be setup independently during different periods of time or concurrently within the same time period. The building automation system may then be configured 904 with the hospitality information system. One or more communication links are formed between the building automation system and the hospitality information system so that the hospitality user profile and/or related information may be communicated between the systems. Next, the voice enabled system may be commissioned 906 with the building automation system. The voice enabled system may be commissioned by manual entry of requisite information to the building automation system by an administrator or similar person or automated commissioning with the assistance of device coordinated with the building automation system, such as the mobile device described above. The general system, including the building automation system, the hospitality information system, and the voice enabled system, may then operate 908 in order to perform the function of managing one or more room devices, such as environmental devices of a guest room. Thereafter, the records and other data of the building automation system, such as the status of various room devices of the managed facility, may be updated 910 based on the operation of the general system. The hospitality information system and/or the voice enabled system may be updated as well.

Configuring 904 the building automation system with the hospitality information system may include associating 914 portions of the hospitality user profile with portions of the guest room profile in an anonymous manner. As described above, the general system correlates or unifies at least a portion of the guest room profile with at least a portion of the hospitality user profile and/or the voice profile. Portions of the guest room profile of the building automation system may be correlated or integrated with portions of the hospitality user profile and/or the voice profile without knowing the identity of the user/occupant or exposing personal identifiable information of users/occupants, stored at the hospitality information system or the voice enabled system, to the building automation system. Thus, portions of the hospitality user profile and/or voice profile may be associated 914 with corresponding portions of the guest room profile while protecting the privacy, such as identity, of the users/occupants.

Commissioning 906 the voice enabled system with the building automation system may include mapping 914 the voice enabled system to the building automation system. To protect user/occupant privacy, information associated with a hospitality user profile and/or a voice profile may be linked to corresponding information of the building automation system by non-identifying data that does not identify a specific occupant. Examples of the non-identifying data include, but are not limited to, a room location such as a building identifier, level identifier, room coordinates, or room number; a sub-room location such as a bed location or partitioned area; and room status such as closed, housekeeping, isolated, contaminated, occupied, or unoccupied. For some embodiments, one or more portions of the voice enabled system may be mapped 914 to one or more portions of the building automation system by scanning both systems to identify one or more common parameters and, then, linking one or more common parameters so that the portions of the voice enabled system and the building automation system associated with these common parameters are correlated or unified with each other. The building automation system may receive and utilize the mapped information to manage and control devices in a room without knowing the identity of the user/occupant.

For some embodiments, when updating 910 the building automation system, the voice enabled system may be updated as well as the building automation system. For example, certain parameters may override settings to generate an automatic profile update of the guest room profile and/or the voice profile. For some embodiments, if a message of the health information system indicates that a hospital room is unoccupied and is received by the building automation system, then the guest room profile and/or the voice profile may reset to a default unoccupied profile. For example, the voice enabled system may prevent voice control until either the guest room is changed to occupied or the setting is overridden by an administrator. Conversely, the guest room profile and/or voice profile may be automatically updated to respond to specific user preferences when a sensor of the building automation system detects a code. For example, a mobile device may read a bar code at the guest room and transmits a responsive signal to a management device of the building automation system, such as, when a user/occupant is moved to a new guest room.

Figure 10:
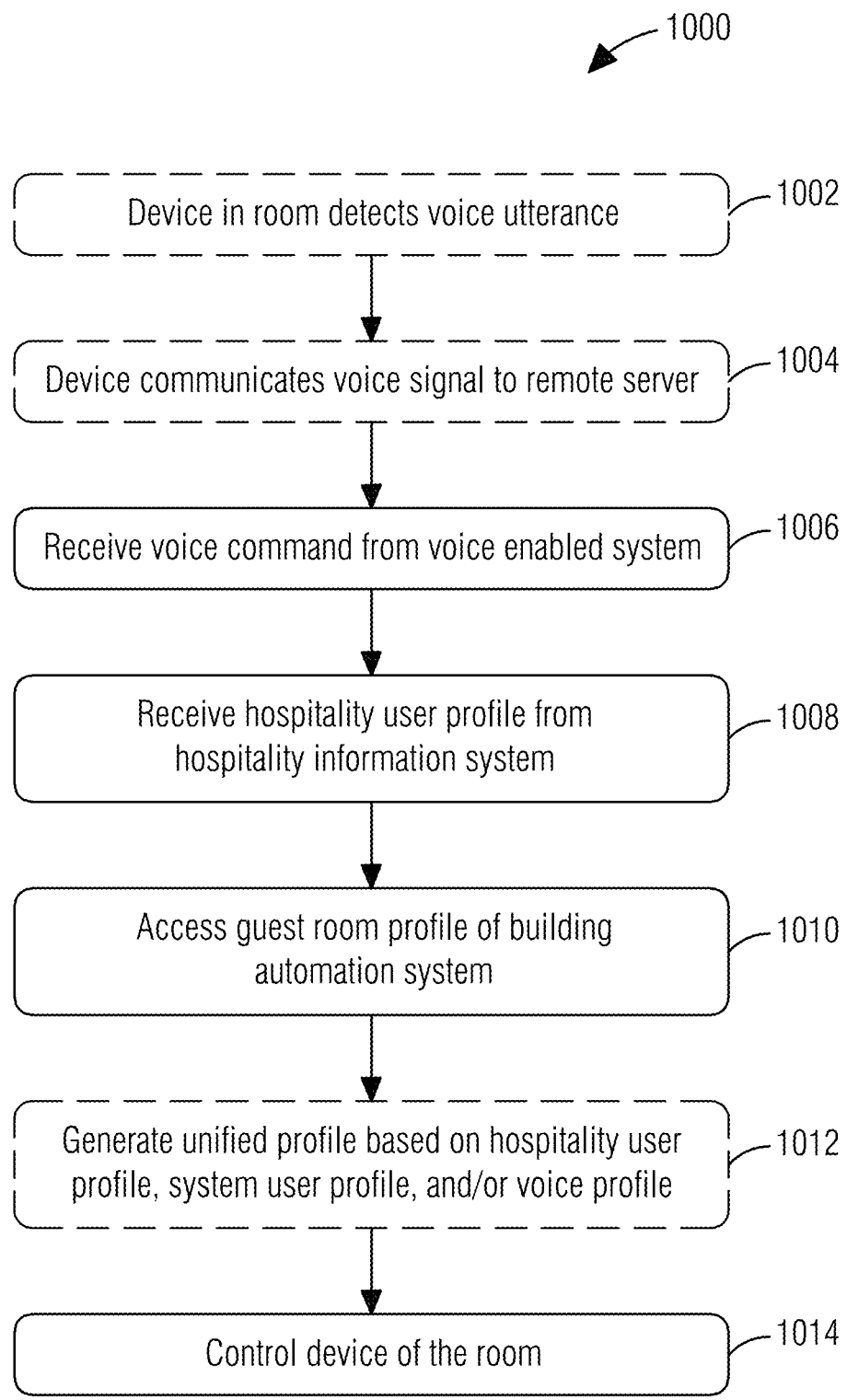
FIG. 10 is a flow chart representing an example operation of the building automation system implementing the techniques described herein.

Referring to FIG. 10, there is shown a flow chart representing example operations of the voice enabled system and the building automation system implementing the techniques described herein. The voice enabled system, namely a voice enabled device of the voice enabled system, detects 1002 voice utterance in the associated guest room. The voice enabled device communicates 1004 a voice signal corresponding to the voice utterance to the voice processing server in response to detecting the voice utterance. The voice enabled system, namely a voice processing service of the voice enabled system, then provides a voice command based on the detected voice utterance in response to receiving the voice signal.

The building automation system, namely a first interface of the building automation system, receives 1006 the voice command based on a voice utterance detected in the guest room by the voice enabled system. In addition to receiving 1006 the voice command, the building automation system obtains or receives 1008 a hospitality user profile from a hospitality information system. The hospitality user profile identifies one or more user parameters associated with the room. For example, the hospitality user profile may include one or more parameters selected from the group consisting of a room status, a reservation specification, a membership specification, a laboratory service, or a clinical treatment. Examples of the room status of the hospitality user profile include an occupancy parameter and a scheduling parameter. The building automation system may also obtain or receive a voice profile from the voice enabled system that identifies one or more parameters selected from the group consisting of a room identifier, an allowed set of voice command, an allowed set of voice utterances, or a wake word parameter. The building automation system then receives or obtains 1010 a guest room profile of the building automation system. The guest room profile identifies one or more access rights to the building automation system associated with an occupant of the room. For example, the guest room profile may include an administrator right and a default user right as well as the one or more access rights of the occupant of the room. For some embodiments, the building automation system may next generate 1012 a unified profile based on a combination of two profiles or all three profiles of the following: the hospitality user profile, the guest room profile, and the voice profile.

Regardless of whether the building automation system generate the unified profile, the building automation system controls 1014 the room device or devices, such as environmental devices of the guest room, based on the voice command, the hospitality profile, and the guest room profile. For some embodiments, the building automation system may control the room device(s) based on the voice profile as well as the voice command, the hospitality profile, and the guest room profile. Examples of the room device include a device selected from the group consisting of a light control device and a temperature control device. Other examples of room devices include, but are not limited to, non-environmental devices such as entertainment systems that may be controlled by a building automation system to provide further room control.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building automation system for controlling conditions of a room comprising:
   a room device associated with the room;
   a first interface operatively coupled to a voice enabled system associated with the room, the first interface being configured to receive a voice command based on a voice utterance detected in the room by the voice enabled system;
   a second interface operatively coupled to a hospitality information system associated with the room, the second interface being configured to receive a hospitality user profile from the hospitality information system, the hospitality user profile identifying at least one user parameter associated with the room; and
   a managing device operatively coupled to the room device associated with the room, the managing device including a guest room profile that identifies at least a room status associated with the room, the room status being selected from a group including an occupancy parameter or a scheduling parameter, and the managing device being configured to control the room device based on the voice command, the hospitality user profile, and the guest room profile,
   wherein the managing device configures the building automation system with the hospitality information system and subsequently commissions the voice enabled system with the building automation system.

2. The system as described in claim 1, wherein:
   the voice enabled system includes a voice profile that identifies at least one voice parameter selected from the group consisting of a room identifier, an allowed set of voice command, an allowed set of voice utterances, and a wake word parameter; and
   the managing device is configured to control the room device based on the voice profile as well as the voice command, the hospitality user profile, and the guest room profile.

3. The system as described in claim 1, wherein:
   the voice enabled system includes a voice enabled device located in the room and a voice processing server located remote from the room;
   the first interface receives the voice command from the voice processing server; and
   the voice enabled device detects the voice utterance in the room and communicates a voice signal corresponding to the voice utterance to the voice processing server.

4. The system as described in claim 1, wherein the hospitality user profile includes at least one user parameter selected from the group consisting of a room identifier, a room status, a reservation specification, a membership specification, a laboratory service, and a clinical treatment.

5. The system as described in claim 4, wherein the room status of the hospitality user profile is selected from the group consisting of an occupancy parameter and a scheduling parameter.

6. The system as described in claim 1, wherein the building automation system is configured with the voice enabled system by receiving configuration information, from a mobile device, based on a code in the room that is scanned by the mobile device.

7. The system as described in claim 1, wherein the guest room profile includes at least one room parameter selected from the group consisting of a room identifier, a room device identifier, a room device operation, a room device activation, and access rights to the building automation system.

8. A method of a building automation system for managing a room device of a room, the method comprising:
configuring the building automation system with a hospitality information system;
commissioning a voice enabled system with the building automation system subsequent to configuring the building automation system with the hospitality information system;
receiving a voice command based on a voice utterance detected in the room by the voice enabled system;
receiving a hospitality user profile from the hospitality information system, wherein the hospitality user profile identifies at least one user parameter associated with the room;
accessing a guest room profile of the building automation system that identifies at least a room status associated with the room, the room status selected from a group including an occupancy parameter or a scheduling parameter;
and
controlling the room device of the room based on the voice command, the hospitality user profile, and the guest room profile.

9. The method as described in claim 8, wherein:
the voice enabled system includes a voice profile that identifies at least one voice parameter selected from the group consisting of a room identifier, an allowed set of voice command, an allowed set of voice utterances, and a wake word parameter; and
controlling the room device of the room includes controlling the room device of the room based on the voice profile as well as the voice command, the hospitality user profile, and the guest room profile.

10. The method as described in claim 8, further comprising:
detecting the voice utterance by a voice enabled device of the voice enabled system located in the room; and
communicating a voice signal corresponding to the voice utterance to a voice processing service of the voice enabled system located remote from the room,
wherein receiving the voice command includes receiving the voice command from a voice processing server.

11. The method as described in claim 8, wherein the hospitality user profile includes at least one user parameter selected from the group consisting of a room identifier, a room status, a reservation specification, a membership specification, a laboratory service, and a clinical treatment.

12. The method as described in claim 11, wherein the room status of the hospitality user profile is selected from the group consisting of an occupancy parameter and a scheduling parameter.

13. The method as described in claim 8, further comprising:
configuring the voice enabled system with the building automation system by receiving configuration information, from a mobile device, based on a code in the room that is scanned by the mobile device.

14. The method as described in claim 8, wherein the guest room profile includes at least one room parameter selected from the group consisting of a room identifier, a room device identifier, a room device operation, a room device activation, and access rights to the building automation system.

15. A system for controlling conditions of a room comprising:
a voice enabled system associated with the room, the voice enable system being configured to provide a voice command based on a voice utterance detected in the room by the voice enabled system;
a hospitality information system associated with the room, the hospitality information system including a hospitality user profile that identifies at least one user parameter associated with the room; and
a building automation system operatively coupled to the voice enabled system and the hospitality information system, the building automation system including a room device associated with the room and a managing device operatively coupled to the room device, the managing device including a guest room profile that identifies at least a room status associated with the room, the room status being selected from a group including an occupancy parameter or a scheduling parameter, and the managing device being configured to control the room device based on the voice command, the hospitality user profile, and the guest room profile,
wherein the building automation system is configured with the hospitality information system and the voice enabled system is subsequently commissioned with the building automation system.

16. The system as described in claim 15, wherein:
the voice enabled system includes a voice profile that identifies at least one voice parameter selected from the group consisting of a room identifier, an allowed set of voice command, an allowed set of voice utterances, and a wake word parameter; and
the managing device is configured to control the room device based on the voice profile as well as the voice command, the hospitality user profile, and the guest room profile.

17. The system as described in claim 15, wherein:
the voice enabled system includes a voice enabled device located in the room and a voice processing server located remote from the room;
the building automation system receives the voice command from the voice processing server; and
the voice enabled device detects the voice utterance in the room and communicates a voice signal corresponding to the voice utterance to the voice processing server.

18. The system as described in claim 15, wherein the hospitality user profile includes at least one user parameter selected from the group consisting of a room identifier, a room status, a reservation specification, a membership specification, a laboratory service, and a clinical treatment.

19. The system as described in claim 18, wherein the room status of the hospitality user profile is selected from the group consisting of an occupancy parameter and a scheduling parameter.

20. The system as described in claim 15, wherein the guest room profile includes at least one room parameter selected from the group consisting of a room identifier, a room device identifier, a room device operation, a room device activation, and access rights to the building automation system.

\* \* \* \* \*